(12) United States Patent
Lennartson et al.

(10) Patent No.: US 8,195,258 B2
(45) Date of Patent: Jun. 5, 2012

(54) METHOD FOR REPETITIVE TRANSMISSIONS

(75) Inventors: Benny Lennartson, Hägersten (SE); Miguel Lopez, Solna (SE); Krister Sundberg, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 330 days.

(21) Appl. No.: 12/527,535

(22) PCT Filed: Feb. 16, 2007

(86) PCT No.: PCT/SE2007/050092
§ 371 (c)(1),
(2), (4) Date: Aug. 17, 2009

(87) PCT Pub. No.: WO2008/100191
PCT Pub. Date: Aug. 21, 2008

(65) Prior Publication Data
US 2010/0105403 A1    Apr. 29, 2010

(51) Int. Cl.
*H04B 7/14* (2006.01)
*H04M 1/00* (2006.01)

(52) U.S. Cl. .................. 455/575.7; 455/101; 455/25
(58) Field of Classification Search .................. None
See application file for complete search history.

(56) References Cited

U.S. PATENT DOCUMENTS

| 5,914,946 | A  | * | 6/1999 | Avidor et al. | 370/336 |
| 6,233,466 | B1 |   | 5/2001 | Wong | |
| 2007/0054617 | A1 | * | 3/2007 | Nikolajevic et al. | 455/41.2 |

FOREIGN PATENT DOCUMENTS

| JP | 2001-086050 | 3/2001 |
| WO | WO 0124385 A2 | 4/2001 |
| WO | WO 2004004148 A1 | 1/2004 |

* cited by examiner

*Primary Examiner* — Erika Gary

(57) ABSTRACT

The present invention relates to method, and apparatus relating to cellular radio communication (300). By communicating information repeatedly in either an uplink or a downlink connection by directing a main lobe of a radiation pattern (331-1 to 331-*n*; 335-1 to 335-*n*) of the communication in different directions (d1, d2, d2, d4) in the cell (361,362) of the cellular radio communication network (300) the reception of repetitive transmission of any information in both uplink and downlink connection with as little complexity added to the network as possible is improved.

25 Claims, 4 Drawing Sheets

METHOD FOR REPETITIVE TRANSMISSIONS

This application is a National Stage entry of International Application No. PCT/SE2007/050092, filed Feb. 16, 2007, the disclosure of which is incorporated herein by reference.

TECHNICAL FIELD

The present invention generally concerns method, and apparatus relating to cellular radio communication. Specifically, the present invention relates to facilitating repetitive transmission in a cellular radio communication network.

BACKGROUND

One main concern for an operator is to make sure that their network provides good coverage and that calls are dropped as rarely as possible. However, when it comes to dropped calls it has been seen that this is often related to handover. The main reason for the dropped calls is that the signaling channels, Fast Associated Control Channel (FACCH) and Slow Associated Control Channel (SACCH) form the weakest link. This becomes even more emphasized when using an Adaptive Multi-Rate Full Rate (AMR FR) codec.

A number of suggestions for improving a success rate of decoding the FACCH and SACCH signaling have already been proposed, such as increasing a FACCH power, repeated FACCH and SACCH. For example is information repeatedly transmitted 5 times on channel SACCH (Slow Associated Control Channel), 23 times for SDCCH (Stand-alone Dedicated Control Channel), 34 times for FACCH (Fast Associated Control Channel), and 48 times for E-FACCH. The maximum number of retransmissions of traffic and signalling depends on the state and on the channel used.

A very simple concept to secure that the receiver of the information retrieves the information correctly is just to transmit the information repeatedly, which implies a copy of the information is sent and sent over again, retransmitted for a predetermined amount of times, or until the recipient has acknowledged that it received it. In prior art such retransmissions are performed by transmitting in a fixed direction over a whole cell in a cellular radio communication network. In a variety of circumstances such retransmissions can be stopped, e.g.:
  if no such acknowledgement is forthcoming within a reasonable time, the time-out, or
  the sender discovers, often through some out of band means, that the transmission was unsuccessful, or
  if the receiver knows that expected data has not arrived, and so notifies the sender, or
  if the receiver knows that the data has arrived, but in a damaged condition, and indicates that to the sender, the sender simply retransmits the data (which it still has a copy of).

In retransmission using incremental redundancy, instead of retransmitting disturbed packets, sends more redundancy information to be combined in the receiver. This increases the probability of correct decoding. In 3GPP TS 04.06 retransmission and incremental redundancy is specified.

Although some of the suggested methods are expected to improve a handover performance or have already been proven to do so, through field trial or other activities, there are still reasons for further improving the performance. These are that the different suggestions may result in different gain depending on the environment. It is also not sure that all will or can be implemented and that further improvements in the speech codec will require even more robust signaling channels.

WO/97/17770 relates to an apparatus and an associated method, incorporating an antenna having an antenna pattern adaptively responsive to propagation characteristics extending between communication stations of a communication system. When the propagation characteristics are indicative of a channel exhibiting only insignificant multipath components, the antenna pattern is selected to be highly directional, and when the propagation characteristics are indicative of a channel exhibiting significant multipath components, the antenna pattern is altered to become less directional.

There are several critical parameters that affect an antenna's performance which can be adjusted during the design process for improving the performance of the antenna. Some of these parameters are resonant frequency, impedance, gain, aperture or radiation pattern, polarization, maximum power rating, efficiency and bandwidth.

In antenna design, "gain" is the logarithm of the ratio of the intensity of an antenna's radiation pattern in the direction of strongest radiation to that of a reference antenna.

The gain of an antenna is a passive phenomenon—power is not added by the antenna, but simply redistributed to provide more radiated power in a certain direction. If an antenna has a positive gain in some directions, it must have a negative gain in other directions as energy is conserved by the antenna. The gain that can be achieved by an antenna is therefore trade-off between the range of directions that must be covered by an antenna and the gain of the antenna. "Aperture", and "radiation pattern" are closely related to gain. Aperture is the shape of the "beam" cross section in the direction of highest gain, and is two-dimensional. Radiation pattern is the three-dimensional plot of the gain, but usually only the two-dimensional horizontal and vertical cross sections of the radiation pattern are considered. Antennas with high gain typically show side lobes in the radiation pattern. Side lobes are peaks in gain other than the main lobe (the "beam").

Further in prior art beam steering is an expression for changing of direction of the main lobe of a radiation pattern. In radio systems, beam steering may e.g. be accomplished by switching antenna elements or by changing the relative phases of the radio frequency signals driving the elements.

Accordingly, it would be highly desirable in cellular radio communication network not only to improve handover performance which is often performed by repetitive transmission but also to improve repetitive transmission of any information in both uplink and downlink connection.

SUMMARY

The problem dealt with by the present invention is enabling improved repetitive transmission of information transmitted in a cellular radio communication network.

According to a first aspect, the invention includes a method in a cellular radio communication network for communicating information repeatedly, in either an uplink or a downlink connection, established in a radio link between a user equipment and a base station serving a cell of a cellular communication network. A: least a first and a second transmission direction are obtained independently of a current position of the user equipment in the cell. Further, the information is at least once communicated by directing a main lobe of a radiation pattern of the communication in the first transmission direction. In the second direction information is communicated at least once by directing a main lobe of a radiation pattern of said communication in the second transmission direction.

According to a second aspect, the invention includes a node for communicating information repeatedly in either an uplink or a downlink connection established in a radio link between a user equipment (and a base station serving a cell of a cellular communication network. The node comprising means for obtaining independently of a current position of the user equipment in the cell, at least a first and a second transmission direction. Comprising further, means for communicating the information at least once by directing a main lobe of a radiation pattern of the communication in the first transmission direction, and means for communicating the information at least once by directing a main lobe of a radiation pattern of the communication in the second transmission direction.

An advantage of an exemplary embodiment of the invention is less complexity due to that no need to keep track of the user equipments, or to have any information of the current position of the user equipments in the cell is necessary.

An advantage of an exemplary embodiment of the invention is less complexity due to that no need to know in advance the propagation characteristics of the channel or to have any information in advance of the channel quality to estimate the transmission.

Another advantage of an exemplary embodiment of the invention is that the lobe width of the radiation pattern can be decreased so an improvement of the link budget in the selected direction is obtained, resulting in an increase of the coverage gain.

Still another advantage of an exemplary embodiment of the invention is that it enables improved reception of repetitive transmission of information, which if the information includes signalling belongs to the weakest link, so less calls are dropped, which improves the coverage in a cellular radio communication network.

Still another advantage of an exemplary embodiment of the invention is that it enables improved handover performance for a user equipment between cells or intra-cell in cellular radio communication network.

Other objects, advantages and novel features of the invention will become apparent from the following detailed description of the invention when considered in conjunction with the accompanying drawings and claims.

DETAILED DESCRIPTION

In the following description, for purposes of explanation and non-limitation, specific details are set forth, such as particular nodes, functional entities, techniques, and standards, etc. in order to provide an understanding of the described technology. For example, one advantageous application is to GSM/EDGE 04.06 (Global System for Mobile Communications/Enhanced Data rates for GSM Evolution) in accordance with 3rd Generation Project Partnership (3GPP) Technical Specification (TS). But other applications and other standards which is related to other Time Division Multiple Access (TDMA) systems may also be employed.

It will be apparent to one skilled in the art that other embodiments may be practiced apart from the specific details disclosed below. In other instances, detailed descriptions of well-known methods, apparatuses, techniques, etc. are omitted so as not to obscure the description with unnecessary detail.

Figure 1:
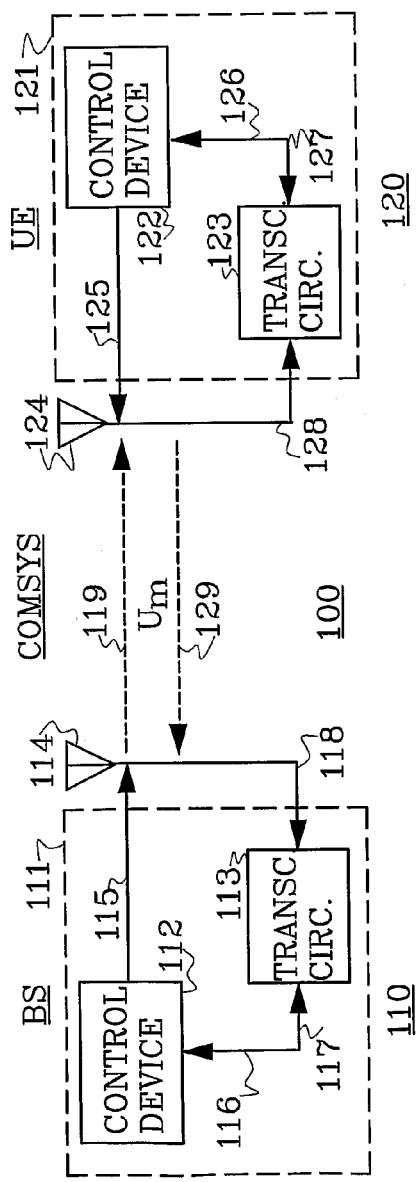
FIG. 1 is a block diagram illustrating a communication system which incorporates an exemplary embodiment of the present invention therein.

FIG. 1 shows, from the point of view of the invention, the essential parts of an example communication system (COMSYS) 100 that includes an exemplary embodiment of the present invention. The communication system 100 is a wireless, or radio, communication system and permits communication in an uplink 129 and downlink 119 connection between a base station (BS) 110 and a user equipment (UE) 120. The base station 120 uses a fixed-location transceiver 111 communicating in a downlink 119 connection to the movable remotely positioned transceiver 121 of the user equipment 120, or vice versa the movable remotely positioned transceiver 121 of the user equipment 120 communicating in a uplink 129 connection to the fixed-location transceiver 111 of the base station transceiver 110.

While the illustrated embodiment includes transceivers 111 and 121, in other embodiments, the transmitting station is formed of only a transmitter and the receiving station is formed of only a receiver.

Information generated by a transmitter portion of the transceivers 111 and 121 are transmitted on one or more radio channels. The transceivers 111 and 121 includes transceiver circuitries 113 and 123 respectively, having each a transmitter portion and a receiver portion. The receiver portion of the transceiver circuitries 113 and 123 is tuned to the radio channel or channels on which the information 119 and 129 generated by the transceivers 111 and 121 are transmitted.

The information transmitted on the radio channel by the transceivers 111 and 121 are detected by antenna devices 114 and 124 respectively, coupled to the transceivers 111 and 121. The antenna devices 114 and 124 converts the radio, electromagnetic signals into electrical signals which are generated on lines 119 and 129 respectively, and supplied to the receiver portion of the transceiver circuitries 113 and 123.

Control devices 112 and 122 are coupled to the transceiver circuitries 113 and 123 by way of the lines 116, 117 and 126,127 to the antenna devices 114 and 124 by way of the lines 115 and 125.

In GSM the air interface Um, between the user equipment 110 and the base station 120 uses for example LAPDm protocol for signaling, to conduct call control, measurement reporting, Handover, Power Control, Authentication, Authorization, Location Update and so on. Traffic and signaling are sent as an example for GSM in bursts of 0.577 ms at intervals of 4.615 ms, to form data blocks each 20 ms.

According to an exemplary embodiment of the invention using that information can be repeatedly communicated to secure that the receiver of the information retrieves the information correctly and at the same time apply that the information is communicated by directing a main lobe of a radiation pattern of the communication in different directions, without obtaining the current position of the user equipment, the increased probability of the receiver to receive the information is maintained at the same time as little complexity as possible is added to the network. In prior art the repetitive transmission is transmitted in a fixed direction over a whole cell in a cellular radio communication network, and by directing instead the radiation pattern of the main lobe in different transmission direction, according to the invention, the link budget can be kept low. The link budget (Received Power (dB)=Transmitted Power (dBm)+Gains (dB)−Losses (dB)) is the accounting of all of the gains and losses from the transmitter, through the medium (free space, cable, waveguide, fiber, etc.) to the receiver in a cellular radio communication network.

According to an exemplary embodiment of the invention, the control devices 112 and 122 are operative not only to control operation of the transceiver circuitries 111 and 121 respectively, but is further operative to control the antenna devices 114 and 124 respectively, to be able to select the main lobe of the antenna pattern of the antenna devices 114 and 124 respectively. The main lobe is selected so that the main lobe of a radiation pattern is directed in different directions, resulting in that the generated information can be repeatedly transmitted on a radio channel in different directions over at least a part of a cell in a cellular radio communication network. The geometry of the main lobe if selected to be increasing elongated in a geometric configuration result in a coverage gain compared to a geometric configuration of a main lobe covering a whole cell, for example a decreased lobe width by half, result in a 3 dB coverage gain.

The energy is less when information is transmitted over a channel with narrow angular distribution, and the main lobe of the radiation pattern of the antenna device is highly-directional and includes an elongated main lobe extending in the direction of the distantly-positioned receiver. Further an elongated main lobe of a radiation pattern of transmitted information tend also to pick up less disturbances. Conversely, if the angular distribution of energy would be broad then the main lobe of the radiation pattern would be more non-directional, i.e., the primary lobe would be less-elongated in configuration and could even cover a whole cell. By repeatedly communicating information on a channel, according to the invention, with e.g. a selected elongated geometry of the main lobe directed in different directions over a part of a cell while repeatedly transmitting, a part of a cell will be covered, or if repeatedly transmitting in different direction of a whole cell, a whole cell could be covered.

In the known Maxwell field equation the field strength of the signal decreases as a first power of distance and power level decreases as a squared function of distance in free space, and these fundamental parameters affect the main lobe of the radiation pattern in the invention.

Figure 2A:
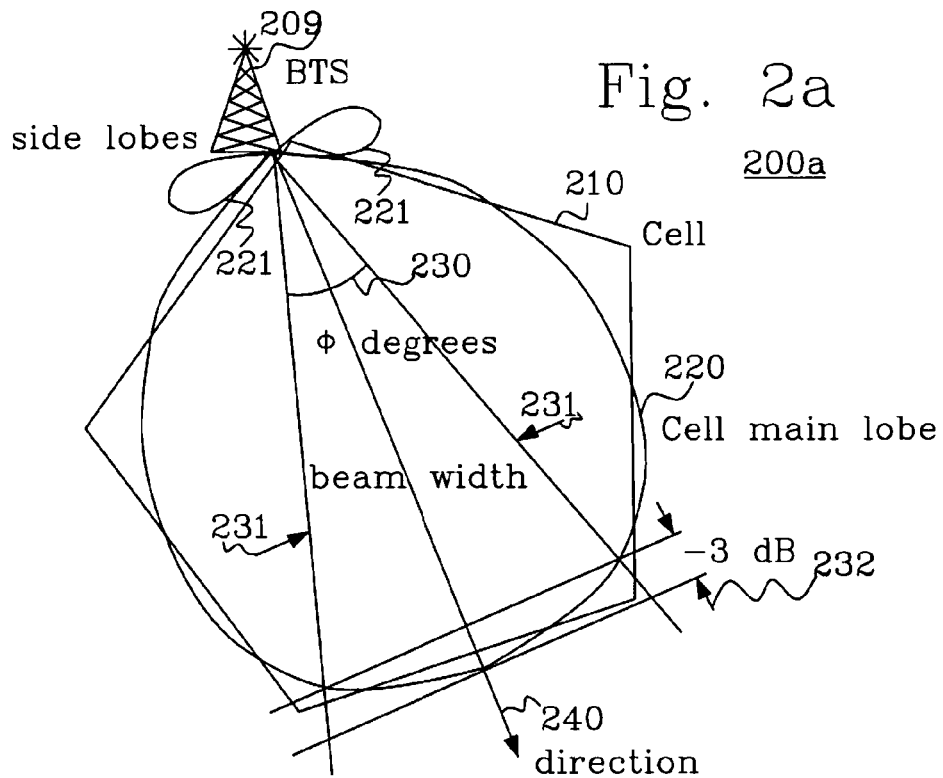
FIG. 2a is a schematic illustration of a part of a cellular radio communication network according to prior art.
Figure 2B:
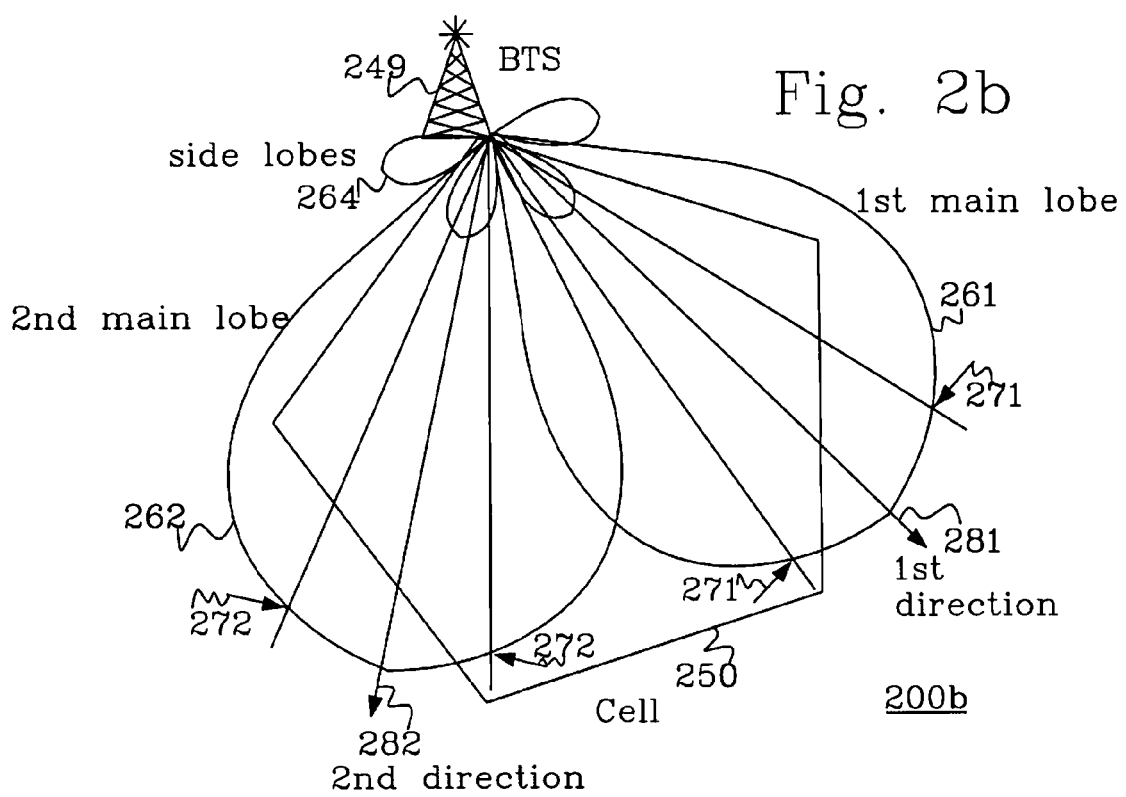
FIG. 2b is a schematic illustration of a part of a cellular radio communication network which incorporates an exemplary embodiment of the present invention therein.

FIG. 2a-b illustrates a part of a cellular radio communication network 200a-b with a cell 210 and 250 which may be defined as an area of radio coverage from one base station 110 in FIG. 1. Typically, cells are represented graphically by hexagons. There are two main types of cell:

Omni directional cell: An omni-directional cell (or omnicell) is served by a base station with an antenna which transmits equally in all directions (360 degrees).

Sector cell: A sector cell is the area of coverage from an antenna, which transmits, in a given direction 240 only, as shown in FIG. 2a. For example, this may be equal to 120 degrees or 180 degrees of an equivalent omni-directional cell. One base station can serve one of these sector cells with a collection of base stations at a site serving more than one, leading to terms such as two-sectored sites and more commonly, three-sectored sites.

Described above is the definition of a cell, said to be defined as an area 210 of radio coverage from one base station 209 as illustrated in FIG. 2a. This radio coverage is also equal to a cell main lobe 220 of a radiation pattern of a communication which coverage is defining the cell 210. The radiation pattern can be produced by the antenna 114 by the base station 110 in FIG. 1, as well as the antenna 124 in the user equipment 120 in FIG. 1, but then not to define the cell. The radiation pattern is the relative power given as a function of the beam angle 230.

Usually the radiation pattern is given in an orthogonal coordinate system or polar coordinate system as shown here in FIG. 2a-b. The actual antenna is limited in size, the radiation pattern has several lobes 220-221 with respect to beam angles 230, as shown in FIG. 2a. The point with zero power is called the null and the pattern between two nulls is called the lobe. The central biggest lobe is called the main lobe 220, while the other lobes are called side lobes 221. The beam width 231 of the antenna is defined as the beam width 231 at the power level 232 of 3 dB downward from the peak of the main lobe 220 (equivalent to the half power beam width). The beam width is also described as the angular range or aperture angle or half power (−3 dB) angle—with notation φ 230. The transmission direction is here illustrated by the arrow 240 and is defined by directing the main lobe 220 of a radiation pattern in the transmission direction 240.

In FIG. 2b according to an exemplary embodiment of the invention, the first and second main lobes 261-262 has a beam width 271-272 which is less than a cell beam width 231, in FIG. 2a, of a cell main lobe 220 which coverage is defining the cell 250. In FIG. 2b the first and second main lobes 261-262 are illustrated to have a beam width 271-272 which is more than half the cell beam width 231, in FIG. 2a, of a cell main lobe 220, in FIG. 2a, required to cover whole the cell 250. It will be apparent to one skilled in the art that other beam widths less than what have been illustrated in FIG. 2a-b for the main lobe can be used for the invention.

Figure 3:
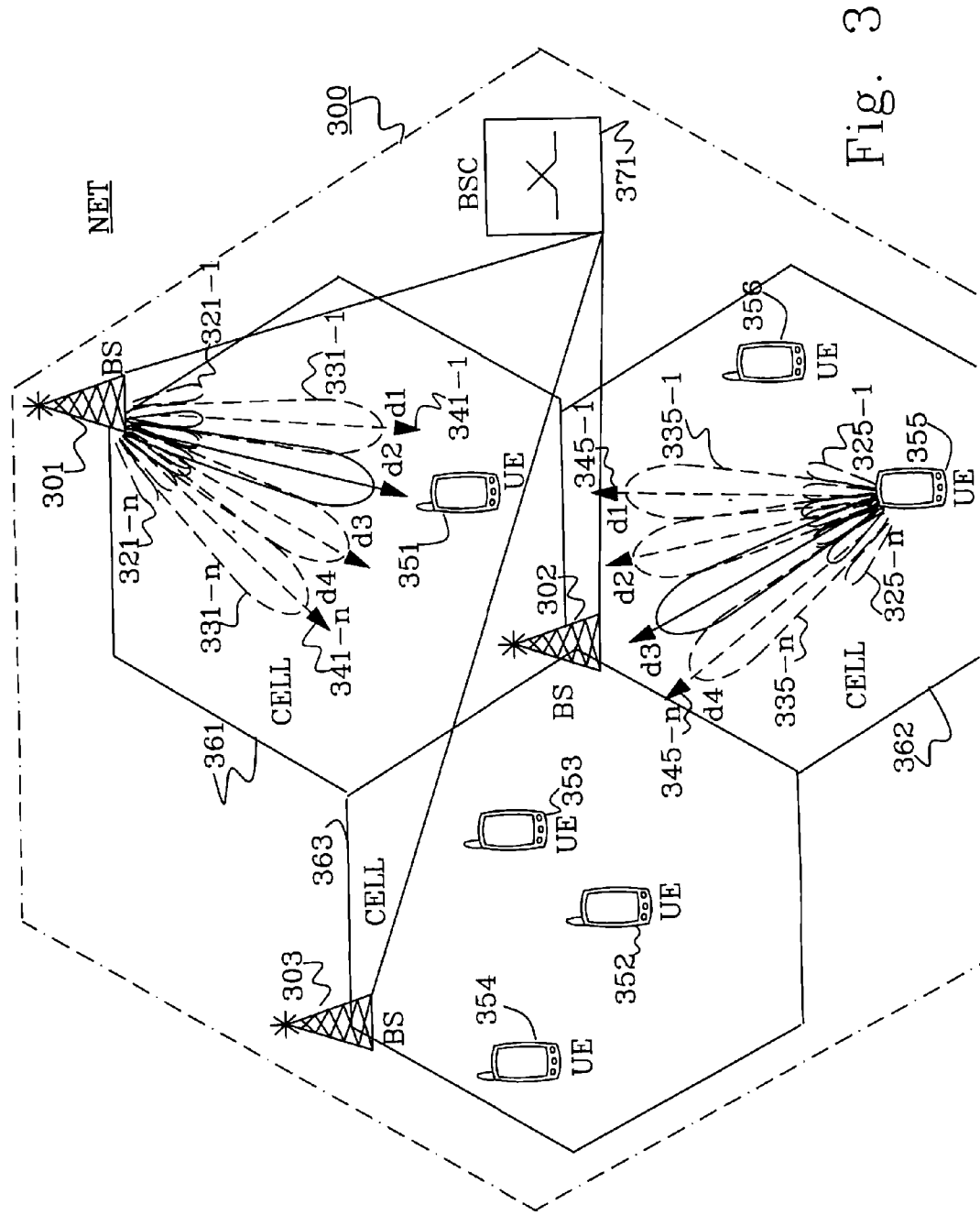
FIG. 3 is a schematic illustration of a part of a cellular radio communication network which incorporates an exemplary embodiment of the present invention therein.

FIG. 3 illustrates a cellular radio communication network, shown in generally at (NET) 300, in which an exemplary embodiment of the present invention may be embodied. The cellular radio communication network 300 includes a plurality of cells 361-363 defined about a geographical area, as described in FIG. 2a. The cells 361-363 are each defined by a radio base station (BS) 301-303, and further shown to having user equipments (UE) 351-356 stationed. The radio base stations 301-303 are, for purposes of illustration, pictured at equally spaced-apart locations throughout the geographic area encompassed by the system 300. The radio base stations 301-303 are each coupled, by way of lines, to a base station controller (BSC) 371. Not shown, is that the base station controller 371 is coupled to a mobile switching center (MSC) and which further is coupled to a public service telephone network (PSTN). Telephonic communication between a calling station of a subscriber fixed or mobile and a selected user equipment 351 or 355 positioned at any location, here 361 or 362, within the geographical area encompassed by the cellular radio communication network 300 is permitted. A call placed to a selected user equipment 351 or 355 is routed to a base station 301 or 302 of the system 300 in conventional manner.

Once the call is routed to an appropriate one of the base stations, e.g. 301 the base station generates information, which is transmitted to the selected user equipment 351, here illustrated as a downlink connection. According to an exemplary embodiment of the invention, at least a first (d1) 341-1 and a second (d2) 341-2 transmission direction is obtained independently of the position of the user equipment 351.

Information is communicated at least once by directing a main lobe 331-1 of a radiation pattern of the communication in the first transmission direction 341-1. Then information is communicated at least once again but now by directing a main lobe 331-2 of a radiation pattern of the communication in the second transmission direction 341-2. The side lobes are shown as 321-1 and 321-2. This is also applicable to the uplink connection shown as the user equipment 355 communicating to the base station 302. First direction (d1) and second direction (d2) is then 345-1 and 345-2, and further obtained independently of a current position of the user equipment 355 in the cell 362. The information is communicated at least once by directing this time the main lobe 335-1 of a radiation pattern of the communication in the first transmission direction 345-1. Further the information is communicated at least once again by directing the main lobe 335-2 of a radiation pattern of the communication in the second transmission direction 345-2. The side lobes are here illustrated as 325-1 and 325-2.

For only illustrated purposes the downlink connection is illustrated as happening in another connection 301->351, than the uplink connection 355->302. Further only four different transmission directions d1-d4, 341-1-4 and 345-1-4 with their main lobes 331-1-4 and 335-1-4 and side lobes 321-1-4 and 325-1-4 are shown. And described above is only about first and second directions d1 and d2. It will be apparent to one skilled in the art that other directions than that are illustrated in FIG. 3 can be used for the inventions covering for example the whole cell, as well as how far the main lobe reaches in the cell, dependant on the beam width. The variety of how the different direction are used according to an exemplary embodiment of the invention is described down below for FIG. 5a-d.

Figure 4:
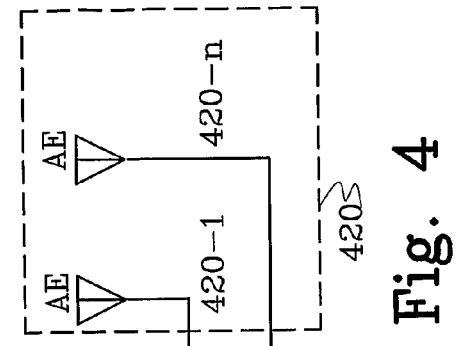
FIG. 4 is a block diagram illustrating a part of a communication system in FIG. 1 which incorporates an exemplary embodiment of the present invention therein.

FIG. 4 illustrates an adaptive antenna system (AESYS) 400, according to an exemplary embodiment of the invention, which can for example be incorporated in the transceivers 111 and 121 respectively, in FIG. 1. An array of antenna elements (AE) 420-1-n, or at least two elements, could e.g. be incorporated in the antenna devices 114 and 124 respectively in FIG. 1. This via a beam former (BF) 410 which e.g. could be a part of the control devices 112 and 122 respectively, in FIG. 1. The antenna array 420 is operative to transmit radio frequency, electromagnetic signals on one or more radio channels. The antenna array 420 is formed e.g., either of a switched beam or steerable beam antenna. The beam former 410 determines the characteristics of the antenna array formed of the antenna elements 420. The beam former 410 may, for example, be formed of a Butler or Blass matrix. Each output of the matrix corresponds to a beam switched in a given beam direction, in conventional manner.

According to an exemplary embodiment of the invention the control devices 112 and 122 respectively, in FIG. 1, are operative to control the beam former 410 in FIG. 4, to cause the adaptive alteration of the main lobe of the radiation pattern, so that the main lobe of the radiation pattern can be directed in different directions. Which results in that the generated information can be repeatedly transmitted on a radio channel, and be covering at least a part of a cell or a whole cell.

The beam former 410 is formed of a single element or a distributed element at each of the antenna elements 420-1 to 420-n. The beam former device 410 switches on or switches off selected ones of the antenna elements 420-1 to 420-n or alters the phase and/or amplitudes of the signals applied to the antenna elements 420-1 to 420-n thereby to cause the antenna pattern to be of desired characteristics.

It will be apparent to one skilled in the art that other solutions than the adaptive antenna system 400 in FIG. 4 can be used for the invention, as long as the antenna is able to alter the size of the main lobe and the direction of the main lobe. As for example one antenna that can be physically altered in direction, in a way so that the main lobe of the radiation pattern follows with its change physically, then only one antenna element would be necessary.

According to prior art, the propagation characteristics of the channel has to be known especially if distortion like multipath distortion with multipath components form significant portions of the signals transmitted between the transceivers, as they affect the signals path badly. For example, in prior art when the propagation characteristics are indicative of a channel exhibiting only insignificant multipath components, the antenna pattern is selected to be highly directional, and when the propagation characteristics are indicative of a channel exhibiting significant multipath components, the antenna pattern is altered to become less directional. Different ways according to prior art to obtain the propagation characteristics is using determinations of distances separating the transceivers, or the angular energy spreading of signals received at the transceivers, or signal strength or signal quality indications. In prior art, thereby the transceiver circuit has to have an increased complexity for obtaining the data behind the propagation characteristics and the control device to calculate the propagation characteristics from the obtained data.

According to an exemplary embodiment of the invention, there is no need for that complexity as described in prior art above, as there are different simple ways off acquiring the different transmission directions. For example in one embodiment by selecting at least first and second transmission direction randomly generated, or in another embodiment by selecting at least first and second transmission direction from a predetermined set of transmission directions. A highly directional signal with a main lobe with a beam width which is less than a cell beam width of a cell main lobe which coverage is defining a cell could be used without the need to have the knowledge of the propagation characteristics as described above. As the highly directional radiation pattern of information is communicated in different directions, at least once in each direction, it is most likely that the receiver will at some point be in the right position to receive the highly directional communicated information, even if multipath components form significant portions of the information transmitted and affect the signals path badly. According to the invention, the information could be repeatedly transmitted in any direction over at least a part of the cell without keeping track of a current position of any user equipment in the cell. As for example, can also be obtained independently of having any information of the quality of a radio channel or of the estimate of the quality of the radio channel.

In other words, according to the invention the scope of adaptive antenna systems is extended, since the quality of the radio channel need not be estimated or known any longer. The present invention re-defines what an adaptive antenna system can be.

According to prior art as described above for 3GPP TS 04.06, retransmission with or without incremental redundancy is used for retransmitting information during traffic and signalling. The way the retransmission is performed according to prior art is with the angular distribution of energy being broad and the main lobe of the radiation pattern being non-directional, i.e., the primary lobe being less-elongated in configuration and in a fixed direction covering the whole cell. In an exemplary embodiment of the invention a data block is generated for transporting the information during the communication in different directions. For each data block a different puncturing or coding scheme can be generated and used on the information, thereby incorporating incremental redundancy into the invention.

According to an exemplary embodiment of the invention, this way of retransmission as in prior art, could be mixed with the invention. For example, if no successful communication of the information to a receiver of the information is accomplished during a first phase of retransmission, a second phase of retransmission can be started. The first phase then being retransmissions by communicating the information repeatedly, by directing a fixed cell main lobe which coverage is defining the cell, according to 3GPP TS 04.06, and the second phase being retransmissions according to the invention. This could also be performed in visa versa order. Between each phase a control could be performed to check if a successful communication of the information to a receiver of the information was accomplished, or after each retransmission according to techniques well known in the art. For example upon a successful communication of the information to a receiver of the information, the communication can be stopped.

FIG. 5a-d illustrates the selection of how the information is repeatedly communicated, according to exemplary embodiments of the invention, using certain predefined set of transmission directions of the main lobe of a radiation pattern in a cell. FIG. 5a-d could also be seen to be illustrating different examples of different randomized set of transmission directions. Then the examples of different transmission directions shown are being selected by generating them randomly, for example during the transmission. The both ways minimize the complexity of the control device 112 and 124 respectively in FIG. 1.

The antenna beam configuration can also be altered as well as the directions, then in a way that the beam width of the main lobe is varied during the communication of the information, which means altered for example during successive time slots of a single frame in a time division multiple access (TDMA) system. The fixed set of different directions can thereby include predefined set of sizes of the beam width of the main lobe of a radiation pattern in different directions. It is though more likely that the lobe characteristics are fixed with for example an elongated main lobe with a beam width which is less than a cell beam width of a cell main lobe which coverage is defining the cell, during the time for which the communication is going on. The different directions are more likely altered while the size of the beam width of the main lobe is fixed. The alteration though of the beam width is also applicable when generating the different directions randomly. Also here it is more likely that a fixed beam width of a certain size is randomly generated or predetermined, during which the different transmission directions are generated randomly, instead of that the different sizes of the beam width is also generated randomly for each generated different direction.

Figure 5:
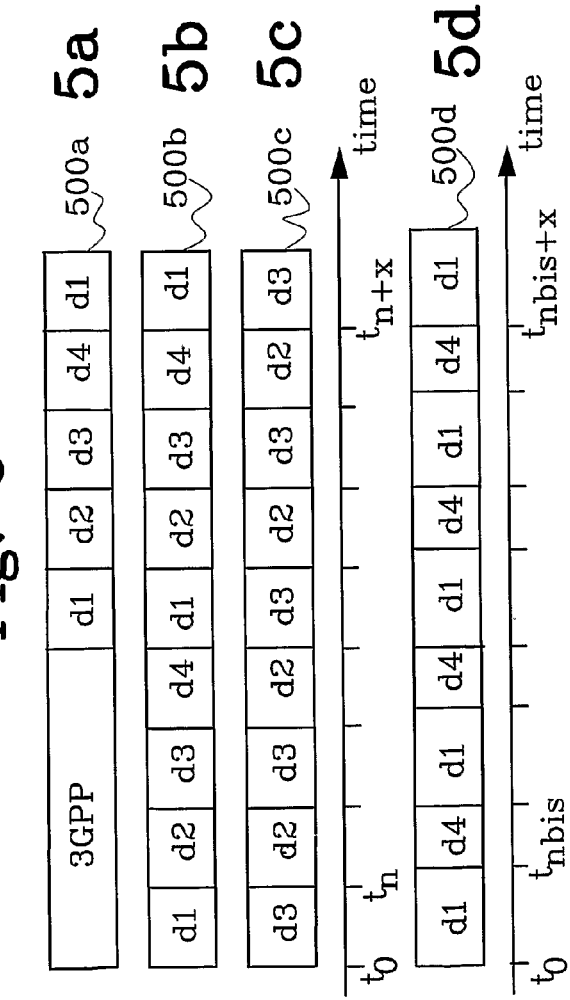
FIG. 5a-d is a time diagram illustrating exemplary embodiments of the information transmitted repeatedly according to the present invention.

FIG. 5a illustrates an example of a set of radiation pattern directions of the main lobe in a cell, wherein the transmission of a communication signal is retransmitted according to the 3GPP TS 04.06 for t4 seconds. Further the direction is in the d1 direction of the cell for t5 seconds, then in the d2 direction for t6 seconds, continuing with d3 and next d4 direction, for another t7 and t8 seconds respectively. Back to the direction d1 for another t9 seconds. FIG. 5b is a cyclic event of direction d1, d2, d3 and d4, for t1-t4 seconds, ending with d1 direction for t9 seconds. FIG. 5c illustrates the pattern of only two directions d3 and d2, during which they are transmitting for t1 seconds cyclic repeating themselves for 4½ times. FIG. 5d is illustrating a cyclic repetition of directions d1 and d4 wherein the time for which the retransmission is going on is varied in one direction. Here is illustrated that in d1 direction the retransmission is going on for t1bis seconds which is illustrated to be longer than for the d4 direction t2bis. This means that if it takes e.g. 5 msec to transmit a burst of information and the time t2bis is equal to 20 msec, and t1bis equal to 30 msec, 4 retransmissions can be performed in the d4 direction and 6 in d1 direction.

It will be apparent to one skilled in the art that other predefined set of transmission directions for the directions of the main lobe in a cell may be practiced apart from the limited amount of variations described here, the variations are endless. The number of directions can vary (e.g. d1, d2, d3, d4, d5, d6, . . . dn), in what way the directions are mixed can vary (e.g. d1, d5, d6, d4, d1 . . . ; d3, d5, d1, d4, d7 . . . ), how many times the different directions are repeated too can vary (e.g. d1, d2, d4, d1, d2, d1, d2, d4, d1, d2, d1, d2, d4 . . . ). As well as for as long time the retransmissions are going on in one direction (e.g. tnbis=2 msec or tnbis=7 msec).

If you apply the predefined set of transmission directions of the main lobe in a cell to the HANDOVER COMMAND being transmitted from the base station 301 to a user equipment 351 in a cell, according to the invention illustrated in FIG. 3. For example every first HANDOVER COMMAND could be transmitted in one direction d1 and every second HANDOVER COMMAND in another direction d4. The time between every HANDOVER COMMAND is 140 ms, according to the 3GPP TS 04.06, so the direction of the main lobe should be changed every 140 ms to fit the standard. Or another solution could be, using a longer time between changing the directions of the main lobe e.g., 280 or 460 ms.

According to prior art, in 3GPP TS 04.06, the HANDOVER COMMAND is transmitted in a fixed direction to a user equipment using a cell main lobe of a radiation pattern of the communication in a cell main lobe which coverage is defining the cell transmission geometry covering the whole cell, repeatedly up to 34 times before a timeout occur.

Figure 6:
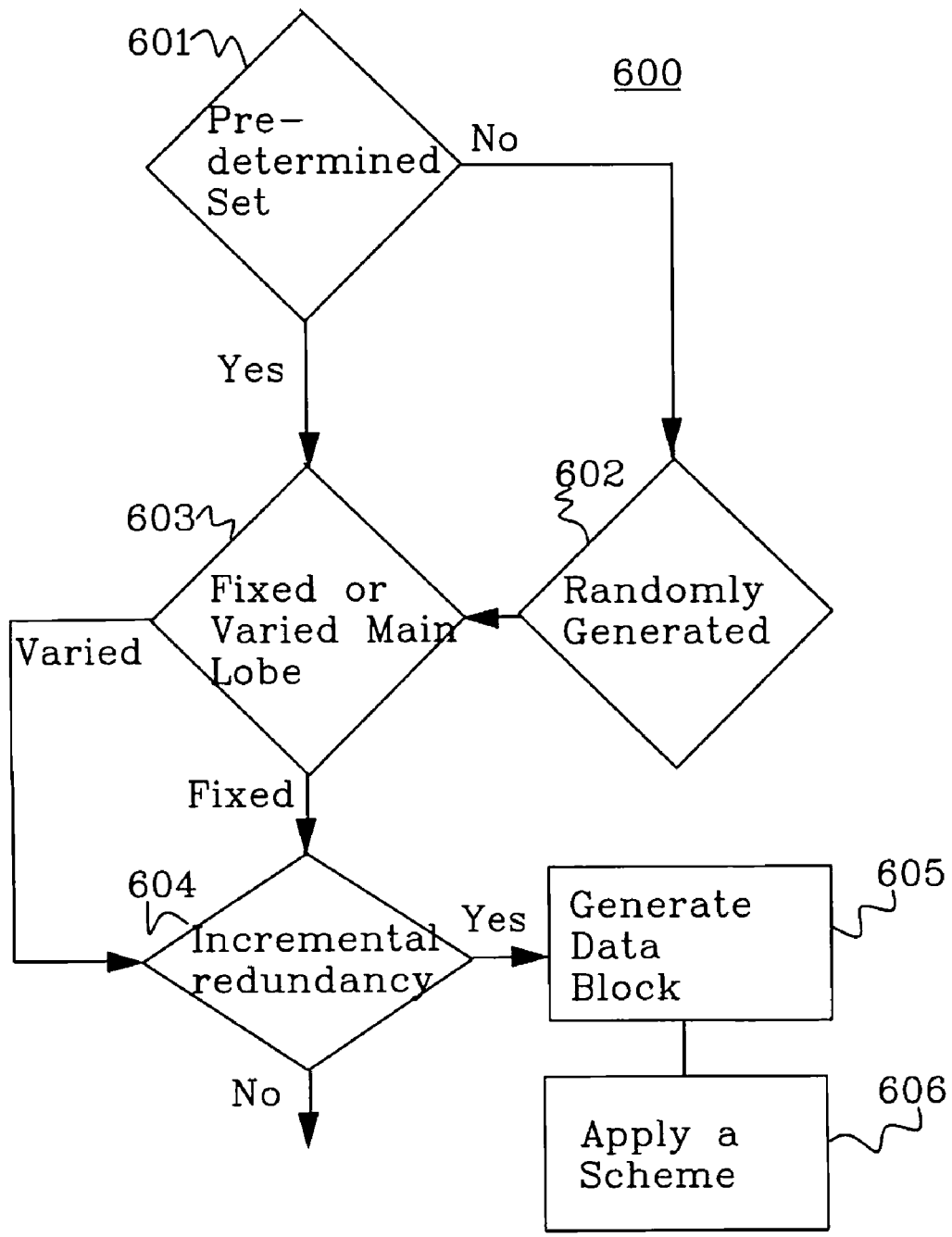
FIG. 6 is a flow chart illustrating an exemplary embodiment of a method for repetitive transmission of information according to the present invention.

FIG. 6 illustrates a flowchart 600, to which on a normal uplink or downlink connection established in a radio link between a user equipment and a base station serving a cell of a cellular communication network, a repetitive communication of information is modified, to incorporate an exemplary embodiment of the invention. According to an exemplary embodiment of the invention, at least a first and a second transmission direction is obtained independently of a current position of the user equipment in the cell, and then the information is communicated at least once by directing a main lobe of a radiation pattern of the communication in the first transmission direction. Further the information is communicated at least once by directing a main lobe of a radiation pattern of the communication in the second transmission direction. The size of the main lobe is set to have a beam width which is less than a cell beam width of a cell main lobe which coverage is defining the cell or, the size of the main lobe can also be set to be even less, with a beam width which for example is more than half the cell beam width of a cell main lobe required to cover whole the cell. In first step 601, the at least first and second transmission direction is selected from a predetermined set of transmission directions, or as in step 602 selected randomly generated. The information can be communicated on a radio channel, and the first and second transmission direction can be obtained independently of having any information of the quality of a radio channel or of the estimate of the quality of the radio channel. Step 603 is illustrating that even if first and second transmission direction is selected from a predetermined set or randomly generated the main lobe can either be fixed or varied.

If incremental redundancy is incorporated into the invention in step 604, then in step 605 a data block is generated for transporting the information during the communication. And in step 606 for each data block generated a different puncturing or coding scheme can be used on the information.

The methods described here are pure illustrative examples for understanding the invention and many modifications are possible, e.g. some steps/actions may be effectuated in a different/reverse order giving the same result, as a person skilled in the art realizes.

The invention claimed is:

1. A method for communicating information repeatedly in either an uplink or a downlink connection established in a radio link between a user equipment and a base station serving a cell of a cellular communication network, characterized in the method comprising:
    a) obtaining independently of a current position of said user equipment in said cell, at least a first and a second transmission direction;
    b) communicating said information at least once by directing a main lobe of a radiation pattern of said communication in said first transmission direction;
    c) communicating said information at least once by directing a main lobe of a radiation pattern of said communication in said second transmission direction; and
    d) communicating said information repeatedly by directing a cell main lobe for which coverage defines said cell.

2. The method according to claim 1, wherein said main lobe has a beam width which is less than a cell beam width of a cell main lobe which coverage is defining said cell.

3. The method according to claim 2, wherein said main lobe has a beam width which is more than half said cell beam width of a cell main lobe required to cover whole said cell.

4. The method according to claim 1, wherein step a):
    involves selecting said at least first and second transmission direction from a predetermined set of transmission directions.

5. The method according to claim 1, wherein step a):
    involves selecting said at least first and second transmission direction randomly generated.

6. The method according to claim 1, wherein said step d) is performed before said step a).

7. The method according to claim 1, wherein upon a successful communication of said information to a receiver of said information, said communication is stopped.

8. The method according to claim 1, wherein said steps a)-c):
    involve communicating said information with said main lobe fixed.

9. The method according to claim 1, wherein said steps a)-c):
    involve communicating said information with said main lobe varied.

10. The method according to claim 1, wherein said steps b)-d):
    involve generating a data block for transporting said information during said communication.

11. The method according to claim 10, wherein for each data block generated a different puncturing or coding scheme is used on said information.

12. The method according to claim 1, wherein communicating said information on a radio channel, and said first and second transmission direction are obtained independently of having any information of the quality of a radio channel or of the estimate of the quality of said radio channel.

13. A node for communicating information repeatedly in either an uplink or a downlink connection established in a radio link between a user equipment and a base station serving a cell of a cellular communication network, characterized in that said node comprising:
    a) a transceiver configured for obtaining independently of a current position of said user equipment in said cell, at least a first and a second transmission direction;
    b) the transceiver further configured for communicating said information at least once by directing a main lobe of a radiation pattern of said communication in said first transmission direction;
    c) the transceiver further configured for communicating said information at least once by directing a main lobe of a radiation pattern of said communication in said second transmission direction; and
    d) the transceiver further configured for communicating said information repeatedly by directing a cell main lobe for which coverage defines said cell.

14. The node according to claim 13, wherein said main lobe has a beam width which is less than a cell beam width of a cell main lobe which coverage is defining said cell.

15. The node according to claim 14, wherein said main lobe has a beam width which is more than half said cell beam width of a cell main lobe required to cover whole said cell.

16. The node according to claim 13, wherein
    the transceiver is further configured for selecting said at least first and second transmission direction from a predetermined set of transmission directions.

17. The node according to claim 13, wherein
    the transceiver is further configured for selecting said at least first and second transmission direction randomly generated.

18. The node according to claim 13, wherein the transceiver is configured to perform said repeated communication of d) before said independent obtaining of a).

19. The node according to claim 18, wherein transceiver is further configured for generating a data block for transporting said information during said communication.

20. The node according to claim 19, wherein for each data block generated a different puncturing or coding scheme is used on said information.

21. The node according to claim 13, wherein upon a successful communication of said information to a receiver of said information, said communication is stopped.

22. The node according to claim 13, wherein
    transceiver is further configured for communicating said information with said main lobe fixed.

23. The node according to claim 13, wherein
    transceiver is further configured for communicating said information with said main lobe varied.

24. The node according to claim 13, wherein the transceiver for communicating said information on a radio channel, and said first and second transmission direction are obtained independently of having any information of the quality of a radio channel or of the estimate of the quality of said radio channel.

25. The node according to claim 13, wherein said node is either a base station having means transmitting in a downlink connection or a user equipment having means transmitting in an uplink connection.

* * * * *

UNITED STATES PATENT AND TRADEMARK OFFICE
CERTIFICATE OF CORRECTION

| | | |
|---|---|---|
| PATENT NO. | : 8,195,258 B2 | Page 1 of 1 |
| APPLICATION NO. | : 12/527535 | |
| DATED | : June 5, 2012 | |
| INVENTOR(S) | : Lennartson et al. | |

It is certified that error appears in the above-identified patent and that said Letters Patent is hereby corrected as shown below:

On the Face Page, in Field (57), under "ABSTRACT", in Column 2, Line 6, delete "(d1, d2, d2, d4)" and insert -- (d1, d2, d3, d4) --, therefor.

In Column 2, Line 59, delete "A:" and insert -- At --, therefor.

Signed and Sealed this
Sixth Day of November, 2012

David J. Kappos
*Director of the United States Patent and Trademark Office*